F. M. NEAL.
Animal-Trap.
No. 212,151.  Patented Feb. 11, 1879.
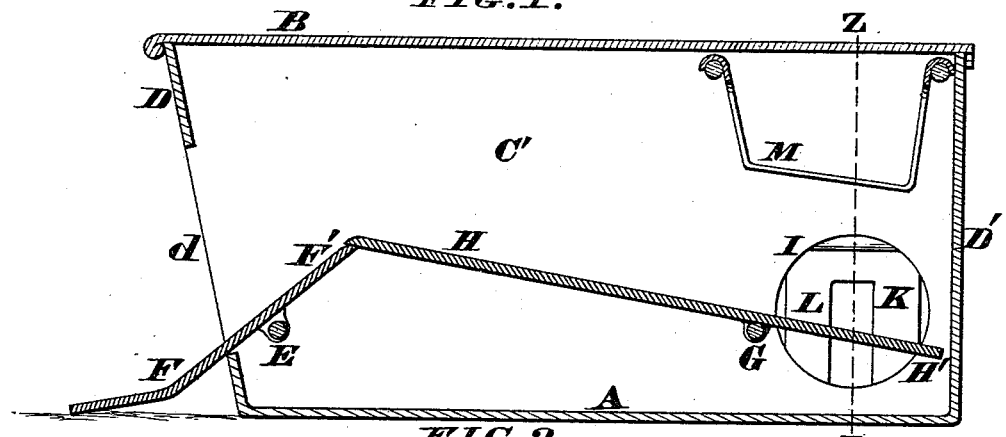
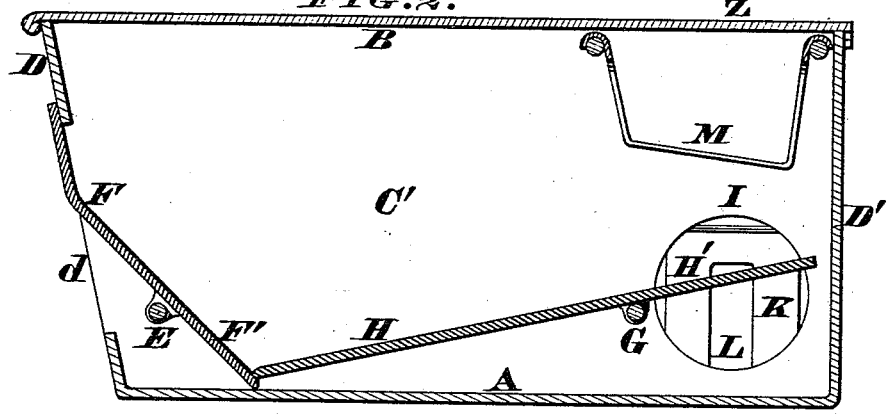
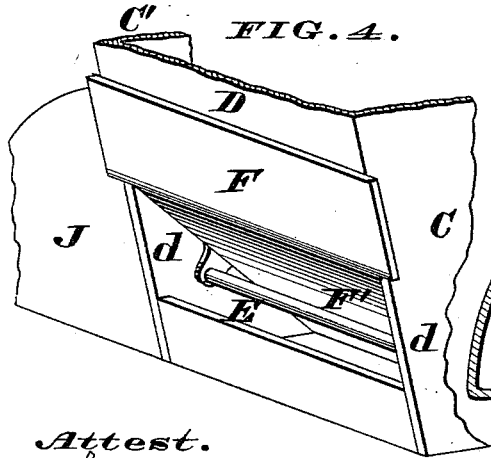
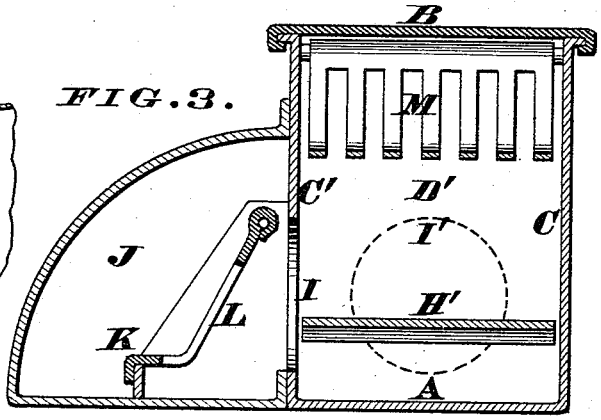
Attest.
John W. Layman
L. H. Bond
Inventor.
Frank M. Neal.
by James H. Layman
his Attorney.

UNITED STATES PATENT OFFICE.

FRANK M. NEAL, OF MOSCOW, OHIO.

IMPROVEMENT IN ANIMAL-TRAPS.

Specification forming part of Letters Patent No. 212,151, dated February 11, 1879; application filed December 7, 1878.

*To all whom it may concern:*

Be it known that I, FRANK M. NEAL, of Moscow, Clermont county, Ohio, have invented certain new and useful Improvements in Rat-Traps, of which the following is a specification:

My trap consists, essentially, of a long narrow box, having at one end an opening capable of being closed by a drop-door hung on a horizontal shaft or on pivots, said shaft being located below the center of this door, in order that the latter may open outwardly as soon as its inner end is relieved from the weight of a tilting-board. This tilting-board is disposed longitudinally of the box, and near the bottom of the same, the pivot or shaft of said board being located at such a distance from the entrance of the trap as to cause the heavier end of the board to rest on the inner end of the drop-door. The end or side of the box remote from the entrance has an exit-opening, guarded by a flap, which exit leads into a chamber that receives the rats as soon as they are caught.

The rat enters by walking up the drop-door, and when he steps on the heavier end of the tilting-bord this end immediately descends, thereby closing said drop-door behind the animal, and affording no avenue for his escape except through the exit of the trap. As soon, however, as the rat attempts to escape through this exit he depresses the inner or lighter end of the tilting-board, and in so doing the outer end of the same is elevated and the drop-door opened to admit the next rat, and so on continuously, as hereinafter more fully described.

In the annexed drawings, Figure 1 is a longitudinal section of my improved rat-trap, the drop-door being shown in its normal or open position. Fig. 2 is a similar section, but showing the positions the drop-door and tilting-board assume the moment a rat enters the trap. Fig. 3 is a transverse section at the line Z Z of Fig. 1; and Fig. 4 is a perspective view of the entrance of the trap, the drop-door being shown closed.

The principal member of my trap is a long narrow box having a bottom, A, a top, B, two sides, C C', and ends D D', of which ends the one, D, flares outwardly, and is provided with an inlet or entrance, d. Disposed athwart this box, and near the end D, is a shaft, E, that serves as a bearing for the drop-door F F', which latter swings freely within the entrance of the trap. This shaft is applied at some distance below the center of said drop, in order that the portion F of the door may be somewhat heavier than the portion F' of the same, by which arrangement said door has a tendency to open outwardly as soon as it is free to assume its normal position.

G is another shaft, disposed athwart the box, and having applied to it the tilting-board H H', whose heavier end, H, rests constantly upon the inner end of the portion F' of the drop-door F F', while the lighter end of said tilting-board just clears the end D' of the trap. The side C' of the box is pierced with an exit, I, leading into chamber J, a hinged flap or door, K, being arranged to prevent the escape of the rat after once entering said chamber J. This flap is perforated or slotted at L to admit light from chamber J, which chamber may be composed of wire or perforated sheet metal, and may be so arranged as to be readily disengaged from box A B C C' D D' when the rats are to be disposed of.

Located above exit I is a basket or other receptacle, M, for the bait.

My trap operates in the following manner: In the normal condition of the device the drop-door F F' is open, and the heavier end of tilting-board H H' rests upon the inner and now elevated end of said drop-door, as seen in Fig. 1, thereby causing the external portion, F, of this door to serve as an inclined platform, for facilitating the entrance of the rat into the trap.

Owing to the disposition of shafts E G with reference to the drop F F' and board H H', said drop and board will remain securely in the above-described positions until a rat or mouse or other animal enters the trap, when the following movements take place: The instant the rat treads on the heavier end, H, of the tilting-board the equilibrium of the latter is at once destroyed, and this heavy end immediately descends, thereby swinging the door F F' upwardly on its bearings E, and completely closing entrance d, as seen in Fig. 2. The rat having thus closed the door behind him, and being frightened by the noise, he at once runs to the opposite end of the box, where light enters through the exit I, and in escaping from tilting-board H H' through said exit, the end H' of said board is depressed; consequently its other end, H, ascends, and drop F F' instantly opens outwardly, and leaves the trap in a proper condition for the next intruder.

From the above description it will be seen that my trap is entirely automatic in its operation, and requires no attention except the occasional replenishing of the bait and the removal of the rats from chamber J.

To facilitate access to the bait-basket M the top B may be arranged as seen in Fig. 3, so as to slide off from the sides C C'. The exit may be made in the end D', as shown by dotted lines I'; or the trap may have two or more exits, and chamber J may surround both sides C C' and said end D' of the trap.

I am aware it is not new to hinge an inwardly-opening door at its extreme lower edge, and effect its closure by means of the animal stepping on a tilting-board disposed longitudinally of the box, as such a construction of rat-trap is seen in Letters Patent No. 195,632, issued September 25, 1877, to J. H. Morris, and therefore my claim is expressly limited to the combination of tilting-board and outwardly-opening door, as herein described and illustrated.

I claim as my invention—

1. An improved rat-trap, consisting of the box A B C C' D D', with an entrance, d, at one end and an outlet, I, at or near its opposite end, said box being provided with a longitudinally-disposed tilting board, G H H', whose heavier end, H, rests upon the inner end, F', of the outwardly-opening door F F', which door is pivoted below its center at E, and serves, when in its normal position, as an inclined platform, to facilitate the entrance of animals into the trap, as herein explained.

2. In combination with the box A B C C' D D' d I, outwardly-opening door E F F', and tilting-board G H H', the outwardly-inclined end D, of said box, for the purpose herein specified.

In testimony of which invention I hereunto set my hand.

FRANK M. NEAL.

Witnesses:
JAMES H. LAYMAN,
GEO. H. KOLKER.